US006962073B2

(12) United States Patent
Hage et al.

(10) Patent No.: US 6,962,073 B2
(45) Date of Patent: Nov. 8, 2005

(54) METHOD AND DEVICE FOR DETERMINING THE VALUES OF STIFFNESS AND DAMPENING OF SURFACES

(75) Inventors: Edward Hage, Helmond (NL); Wynand Witbreuk, Oldenzaal (NL); Geurt Bastiaan Slootweg, Enschede (NL); Marinus Hendrikus Olde Weghuis, Oldenzaal (NL)

(73) Assignee: Ten Cate Thiolon B.V., Re Nijverdal (NL)

( * ) Notice: Subject to any disclaimer, the term of this patent is extended or adjusted under 35 U.S.C. 154(b) by 0 days.

(21) Appl. No.: 10/466,318

(22) PCT Filed: Feb. 1, 2002

(86) PCT No.: PCT/NL02/00077

§ 371 (c)(1),
(2), (4) Date: Jan. 8, 2004

(87) PCT Pub. No.: WO02/063267

PCT Pub. Date: Aug. 15, 2002

(65) Prior Publication Data

US 2004/0163448 A1 Aug. 26, 2004

(30) Foreign Application Priority Data

Feb. 7, 2001 (NL) ............................................ 1017304

(51) Int. Cl.$^7$ ................................................. G01N 3/32
(52) U.S. Cl. .......................................................... 73/83
(58) Field of Search ................................ 73/78, 81, 82, 73/83, 84, 85, 803, 818

(56) References Cited

U.S. PATENT DOCUMENTS

| | | | |
|---|---|---|---|
| 3,813,929 A | 6/1974 | Hardin et al. ................... | 73/84 |
| 3,879,982 A * | 4/1975 | Schmidt ..................... | 73/12.01 |
| 4,682,608 A | 7/1987 | De Rigal et al. ............ | 128/774 |
| 5,621,172 A | 4/1997 | Wilson et al. ................ | 73/579 |
| 5,660,255 A * | 8/1997 | Schubert et al. ............ | 188/378 |
| 5,823,307 A * | 10/1998 | Schubert et al. ............ | 188/378 |

FOREIGN PATENT DOCUMENTS

| | | |
|---|---|---|
| DE | 2322469 | 11/1974 |
| FR | 2785678 | 5/2000 |
| WO | WO91/19173 | 12/1991 |

OTHER PUBLICATIONS

Seidel, Technisches Messen 63 (1996) 5, pgs. 175–181, Messung von Vierpolparametern schwingungsmindernder mechanischer . . . .

Heukelom et al. Jour of Sci Instr 1968, Series 2, vol. 1, pp. 127–132, An improved mobile unit for the dynamic testing of . . . .

\* cited by examiner

Primary Examiner—Max Noori
(74) Attorney, Agent, or Firm—Jacobson Holman PLLC

(57) ABSTRACT

The present invention relates to a method for determining the values of stiffness and dampening, in particular of surfaces for sports fields. The invention furthermore relates to a device for carrying out the aforesaid method. The object of the present invention is to provide a method and a device for determining the values of stiffness and dampening of an artificial grass lawn which provide a reliable measuring result in a quick and efficient manner, which device is furthermore user-friendly and easy to transport. In order to accomplish the aforesaid objective, the method according to the invention is characterized in that a block is placed on the surface in question, which block is struck by means of an electrically controlled excitator at an adjustable frequency interval, at a force which is sensed as a first signal by a force sensor, after which the acceleration of the block is determined as a second signal by means of an acceleration sensor, after which the frequency-dependent transfer function is determined using the aforesaid signals, from which the frequency-dependent stiffness and dampening behaviour of the surface in question is subsequently determined.

4 Claims, 3 Drawing Sheets

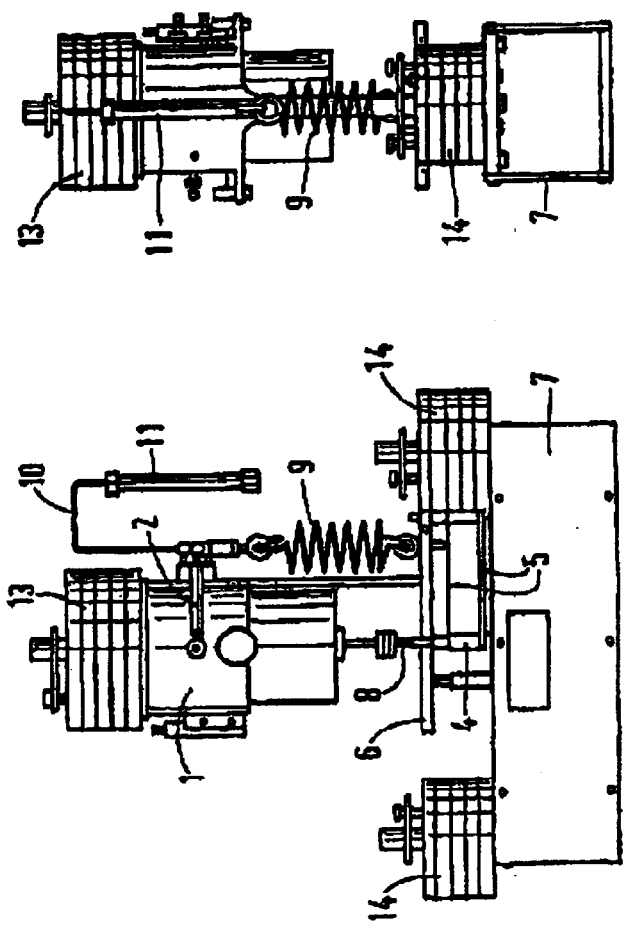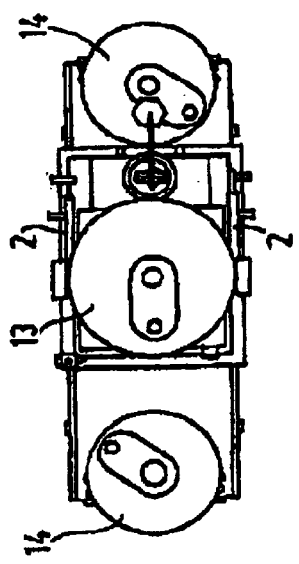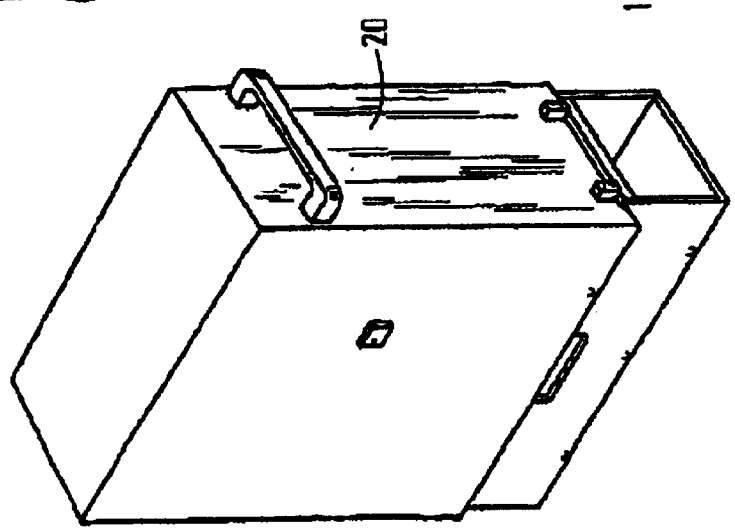

METHOD AND DEVICE FOR DETERMINING THE VALUES OF STIFFNESS AND DAMPENING OF SURFACES

This is a nationalization of PCT/NL02/00077 filed Feb. 1, 2002 and published in English.

DESCRIPTION

The present invention relates to a method for determining the values of stiffness and dampening, in particular of surfaces for sports fields. The invention furthermore relates to a device for carrying out the aforesaid method.

For a number of years already the use of artificial grass as a substitute for natural grass has received a lot of attention. Artificial grass lawns usually consist of fibres of various kinds of synthetic materials, which are fixed to a mat of a carrier material by tufting or otherwise.

Such artificial grass lawns have a number of properties which are different from those of natural grass. Think in this connection of the friction between the lawn and the sporter's feet; burns caused by friction and properties such as the stiffness and dampening of the lawn.

Having a knowledge of the properties and the behaviour of this kind of artificial grass is becoming more and more important now that also applications such as soccer fields are being considered. Furthermore there is a possibility of the properties of the lawn changing after the lawn has been played on for some time.

In order to make artificial grass lawns suitable in particular for other uses as well, a number of relevant properties should be further improved. The starting point is to obtain a safe artificial grass lawn which should optimally spare the player's feet and the player himself, whilst the bouncing behaviour of the ball should resemble the behaviour on natural grass as much as possible. Among the properties that play an important role with regard to a player falling and the bouncing of the ball are the properties of stiffness and dampening of the lawn. Many measuring devices and methods have been proposed for measuring the stiffness and dampening properties of artificial grass lawns and thus acquire a greater insight into these properties. In practice it has become apparent, however, that the results obtained by means of these devices and the ease of use thereof are not satisfactory.

The object of the present invention is to provide a method and a device for determining the values of stiffness and dampening of a artificial grass lawn which provide a reliable measuring result in a quick and efficient manner, which device is furthermore user-friendly and easy to transport.

In order to accomplish the aforesaid objective, the method according to the invention is characterized in that a block is placed on the surface in question, which block is struck by means of an electrically controlled excitator at an adjustable frequency interval, at a force which is sensed as a first signal by a force sensor, after which the acceleration of the block is determined as a second signal by means of an acceleration sensor, after which the frequency-dependent transfer function is determined using the aforesaid signals, from which the frequency-dependent stiffness and dampening behaviour of the surface in question is subsequently determined.

When using the method according to the invention, a value of stiffness as well as a value of dampening of the artificial grass lawn in question can be obtained very quickly by means of the transfer function by placing the block on an artificial grass lawn.

Values of stiffness and dampening of the artificial grass lawn at different locations can be obtained very quickly by moving the block across the surface. Furthermore it is possible, by placing the block on different types of artificial grass, to obtain reference values of stiffness and dampening of said different types of artificial grass.

According to another advantageous embodiment of the method according to the invention, the values of stiffness and dampening are determined by striking the block with a large number of first input signals at a specific frequency-interval and sensing the related second output signals of the block, thus determining the specific transfer functions for each frequency, after which the peak-shaped natural frequency is determined as a measure of the stiffness and a width of the peak of the natural frequency is used as a measure of the dampening value. With the method according to the invention, the block is struck with an input signal which consists of a noise or sweep signal over a frequency interval to be adjusted. It has become apparent that this results in a number of output signals, whose amplitudes and frequencies are shifted. The amplitudes of the input signal and the output signal in that have the same frequencies are divided by each other. The amplitude ratios that are obtained in this manner are subsequently plotted in a special diagram for each frequency, from which it will soon become apparent that a peak occurs in the amplitude ratios at a certain frequency, the so-called natural frequency. It has become apparent that the height of this peak is a measure of the stiffness of the lawn to be measured, while the width of the peak is a measure of the dampening of the lawn to be measured. In this manner it is fairly simple to obtain a quick impression of the degree of stiffness and dampening of a particular field or of a particular type of artificial grass.

The invention furthermore relates to a device for carrying out the above-described method, which is characterized in that an excitator comprising two masses is to be vibrated in a springing manner with respect to each other is suspended, by means of weak springs, in a frame which is supported, via an intermediate part, on a block which can be placed on a surface whose values of stiffness and dampening are to be determined, wherein the excitator is guided in the frame in such a manner that unimpeded movement of the moving masses is only possible in a direction perpendicularly to the block, wherein the lower excitator mass co-operates, via a slender bar, with the intermediate part and wherein means are present for varying the mass on the slender bar, wherein the intermediate part is connected to the block via a force sensor and a guide.

According to another advantageous embodiment of the device according to the invention, the excitator housing is connected to the frame by means of three first parallel rod guides, wherein the housing is furthermore coupled to the frame by means of two further parallel rods extending in a plane perpendicularly to said first rods. In this way a reliable guidance for the housing in the frame is obtained whilst the housing is at the same time secured against tilting.

In order to be able to vary the measuring range of the device, the mass both of the excitator and of the block can be varied by means of additional loading weights.

In order to increase the force with which the excitator housing strikes the aforesaid block, additional masses can be placed on top of the housing. In order to place the excitator housing in the neutral position again, the housing is connected to an extension spring, which can be additionally tensioned by means of a cable construction.

The invention will now be explained in more detail with reference to the drawing.

FIG. 3 shows the device of FIG. 2, which is present in a transport case,

FIGS. 4a–4c show three mutually perpendicular views of the device according to FIGS. 1 and 2, from which the part of the frame in which the excitator is suspended has been left out.

FIG. 5 shows a diagram of the transfer function between the first input signals and the second output signals.

Figure 1:
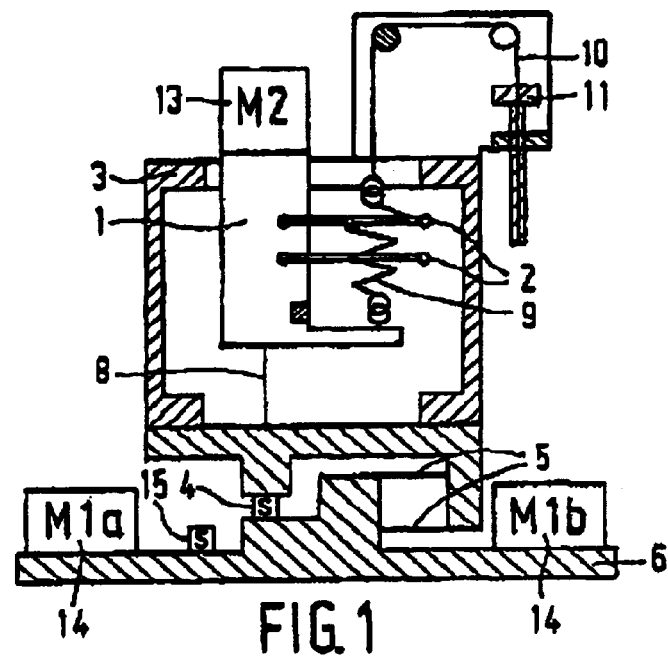
FIG. 1 shows a schematic representation of a device for measuring the values of stiffness and dampening of a surface.

In FIG. 1, reference number 1 indicates an excitator housing. Present in this housing is a known excitator consisting of two vibrating masses separated by a spring, which can be driven by applying an electrical voltage. The excitator housing 1 is connected, via guides 2, to a frame 3 which surrounds the excitator housing. The excitator housing 1 is in fact guided by three guides 2, only the two guides that are present on the front side as shown in this schematic representation, the third guide is present at the rear side of the housing 1. The housing 1 is furthermore connected to the frame 3 by two elastic connections 2 (not shown), which lie in a plane which extends perpendicularly to the direction of the guides 2. The guides that have been mentioned above are all fairly flexible, so that the overall suspension of the excitator housing 1 in the frame 3 is slack, so that the excitator vibrations will only be transmitted to the frame 3 to a small extent. The frame 3 is connected to a block 6 via a force sensor 4 and an associated guide 5, which block is connected to a block 7 in the practical embodiment. The excitator housing 1 co-operates with a part of 6 of the frame 3 via a probe 8. The load on the excitator housing 1 can furthermore be controlled by means of an extension spring 9 which is connected, via a cable 10, to an adjusting screw 11, by means of which the tension of the extension spring 9 and thus the load on the excitator housing 1 can be varied.

Figure 2A:
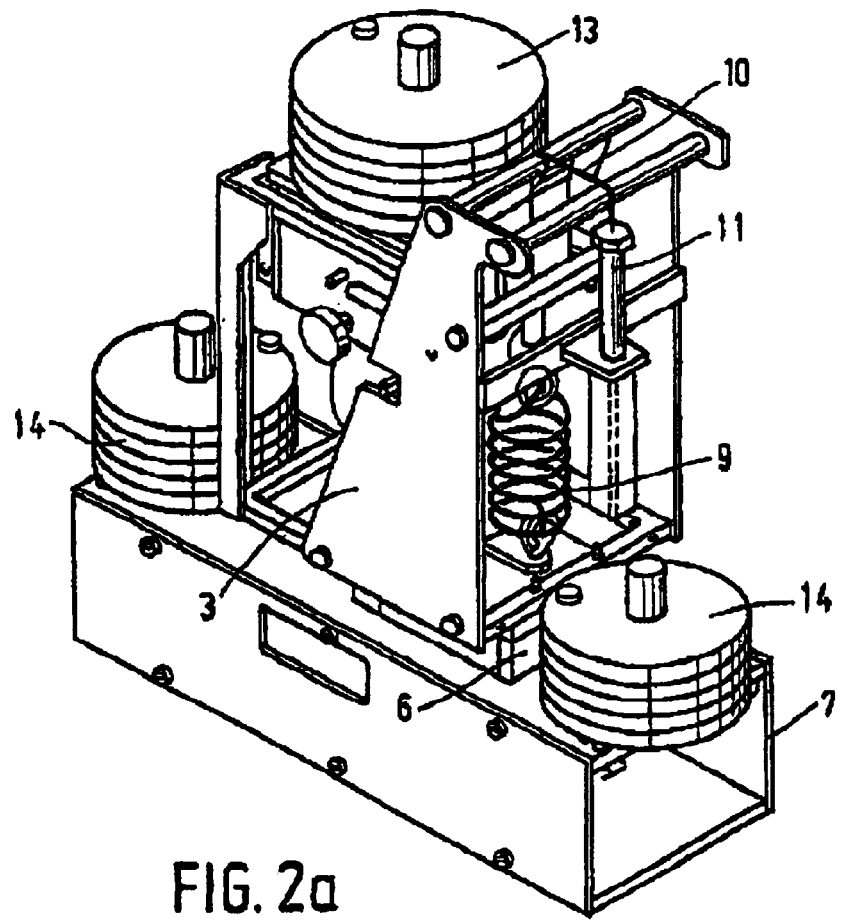
FIGS. 2a–2c show three perspective views of a measuring devices according to FIG. 1 in a practical embodiment thereof.
Figure 2B:
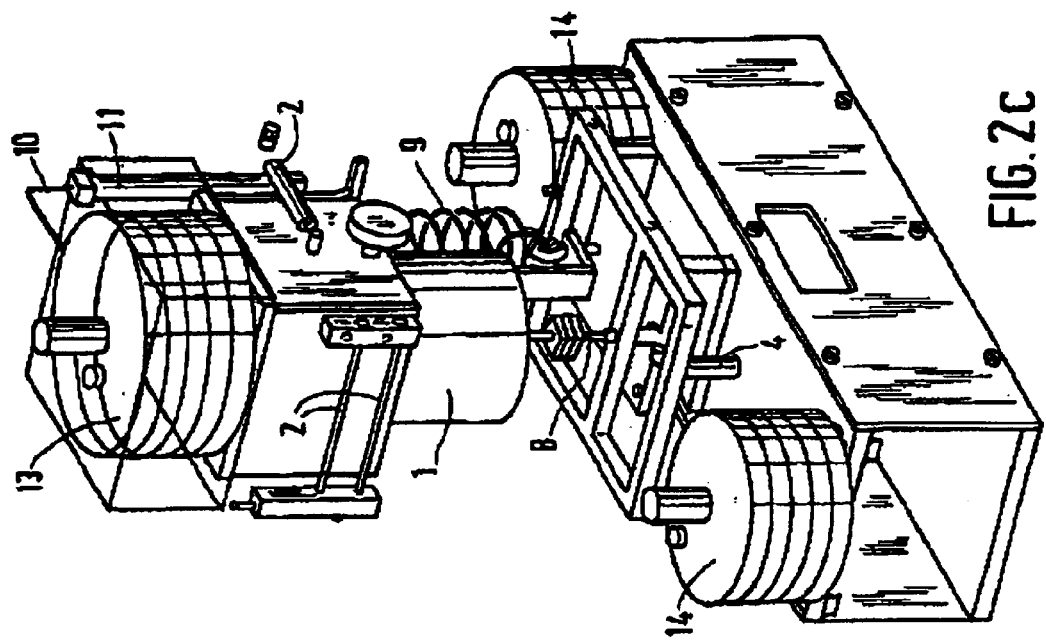
Figure 2C:
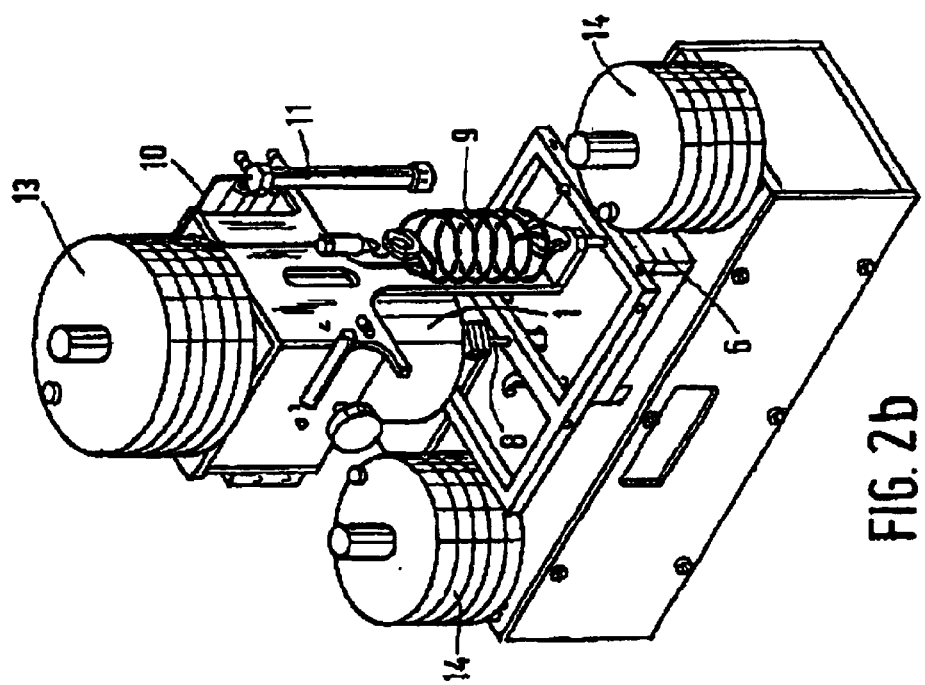

A practical embodiment of the above-described schematically illustrated device is furthermore schematically shown in FIGS. 2a, 2b and 2c. In these figures, parts that correspond to parts which are shown in FIG. 1 are indicated by the same numerals, so that a further explanation of these parts is not necessary. It should be noted, however, that the load on the excitator housing 1 can be varied by means of the loading weights 13, whilst the same can be done by means of the loading weights 14 that rest on the block 7. FIG. 3 shows the same device as in the preceding figures, with this difference that the device is now accommodated in a transport housing 20 which surrounds the device.

To be perfectly clear, the device that is shown in FIGS. 2a, 2b, 2c, is shown once again in FIGS. 4a, 4b, 4c in three mutually perpendicular views, from which the frame 3 has been left out.

The operation of the device is as follows. In the first place, the device with the block 7 is placed on a surface to be measured, for example a sports field covered with artificial grass. Following that, the excitator that is present in the housing 1 is driven with a voltage having 4 specific frequency and strength. This causes the excitator to vibrate, and this vibration is transmitted to the intermediate part 6 via the probe 8 and then, via the intermediate part 6, to the block 7. An acceleration sensor measures the resulting vibration of the block 7 and the intermediate part 6 as an output signal having a specific frequency and amplitude. This frequency and amplitude appear to be slightly different from the input signal that had been transmitted from the excitator 1 to the housing via the probe 8. By operating the excitator 1 with a number of voltages having different frequencies, different output signals are obtained via the acceleration sensor 15. The amplitudes of the input signals and the output signals are now divided by each other for every frequency, so that the ratio per frequency is obtained. These amplitude ratios (transfer functions) $H_e$ are plotted an the vertical axis in a diagram, whilst the associated frequencies are plotted on the horizontal axis. An example is shown in FIG. 5.

It has become apparent of that a peak—the so-called natural frequency $H_e$—occurs at a specific frequency, in this case at $H_e$ and it has become apparent that the height of this peak $H_e$ is a measure of the stiffness of the lawn being measured. Furthermore it has become apparent that the width of the peak around the natural frequency $H_e$ a measure of the value of dampening of the lawn. In this surprisingly simple manner, a measure both of the value of stiffness and of the value of dampening of the lawn has been obtained, by means of which it can be determined whether the lawn has the properties that are desirable for a specific game. If this is not the case, either a different type of artificial grass must be found, or the artificial grass that has been measured must be renewed.

The measuring device as described above is of robust size and easy to transport by means of a transport case (see FIG. 3), and its dimensions furthermore make it easy to operate. The device can be rendered suitable for different measuring ranges by adding loading weights 13 and/or 14 to, respectively, the excitator and the contact box 7.

What is claimed is:

1. A device for determining the values of stiffness and dampening of surfaces for sports fields comprising
   a block which can be placed on a surface whose values of stiffness and dampening are to be determined,
   an excitator for striking said block with input signals at an adjustable frequency interval, as well as
   sensor means for sensing output signals resulting from said input signals and determining the values of stiffness and dampening of said surface based an said resulting output signals,
   characterized in that said excitator comprising two masses that are vibrated by the same one driving unit, which masses are to be vibrated in a springing manner with respect to each other, is suspended, by means of weak springs, in a frame, which is supported, via an intermediate part, on said block and wherein the excitator is guided in the frame in such a manner that unimpeded movement of the moving masses is only possible in a direction perpendicularly to the block, wherein the lower excitator mass co-operates, via a slender bar, with the intermediate part and wherein means are present for varying the mass on the slender bar, wherein the intermediate part is connected to the block via a force sensor and a guide.

2. A device for determining the values of stiffness and dampening of surfaces for sports fields comprising
   a block which can be placed on a surface whose values of stiffness and dampening are to be determined,
   an excitator for striking said block with input signals at an adjustable frequency interval, as well as
   sensor means for sensing output signals resulting from said input signals and determining the values of stiffness and dampening of said surface based on said resulting output signals, characterized in that said excitator comprising two masses, which masses are to be vibrated in a springing manner with respect to each other, is suspended, by means of weak springs, in a frame, which is supported, via an intermediate part, on said block and wherein the excitator is guided in the frame in such a manner that unimpeded movement of the moving masses is only possible in a direction perpendicularly to the block, wherein the lower excitator mass co-operates, via a slender bar, with the intermediate part and wherein means are present for varying the mass on the slender bar, wherein the intermediate part is connected to the block via a force sensor and a guide; and characterized in that the excitator housing is connected to the frame by means of three first parallel rod guides, wherein the housing is furthermore coupled to the frame by means of two further parallel rods extending in a plane perpendicularly to said first rods.

3. A device for determining the values of stiffness and dampening of surfaces for sports fields comprising a block which can be placed on a surface whose values of stiffness and dampening are to be determined, an excitator for striking said block with input signals at an adjustable frequency interval, as well as sensor means for sensing output signals resulting from said input signals and determining the values of stiffness and dampening of said surface based on said resulting output signals, characterized in that said excitator comprising two masses, which masses are to be vibrated in a springing manner with respect to each other, is suspended, by means of weak springs, in a frame, which is supported, via an intermediate part, on said block and wherein the excitator is guided in the frame in such a manner that unimpeded movement of the moving masses is only possible in a direction perpendicularly to the block, wherein the lower excitator mass co-operates, via a slender bar, with the intermediate part and wherein means are present for varying the mass on the slender bar, wherein the intermediate part is connected to the block via a force sensor and a guide; and characterized in that an extension spring is connected to the excitator housing, the tension of which spring can be increased or decreased by means of a cable fitted with a tightening screw.

4. The device according to claim 1, characterized in that the mass both of the excitator and of the block can be varied by means of additional loading weights.

* * * * *